Oct. 22, 1946.  L. SHAKESBY ET AL  2,409,907
MEANS FOR SECURING FITTINGS TO CONTAINERS
Filed April 7, 1943

Inventors:
LEONARD SHAKESBY,
CHARLES ANDREW ROY SUTHERLAND,
AND SYDNEY HARTLEY SMITH
By
A. M. Houghton
Attorney Patented Oct. 22, 1946

2,409,907

UNITED STATES PATENT OFFICE 2,409,907

MEANS FOR SECURING FITTINGS TO CONTAINERS

Leonard Shakesby and Charles Andrew Roy Sutherland, Wolverhampton, and Sydney Hartley Smith, Manchester, England, assignors to Imperial Chemical Industries Limited, a corporation of Great Britain Application April 7, 1943, Serial No. 482,218
In Great Britain March 5, 1942

12 Claims. (Cl. 285—25)

This invention relates to means for securing filler caps, inspection covers, outlet pipes and like fittings to fluid containers, of the kind in which the material of the container adjacent an aperture in the wall thereof is clamped between a substantially rigid annular member located on the inner surface of the container and a substantially rigid annular member or plate-like member on the outer surface of the container. The invention is applicable to such fittings for fuel and oil containers for aircraft and other vehicles.

Usually in the attachment of such fittings to a container, the material of the container adjacent the aperture therein is clamped between the inner and outer members by means of a plurality of nuts or the like in screw-thread engagement with bolts extending through aligned apertures in the said members and in the material of the container, sealing washers or the like being provided to make a liquid-tight joint. In certain circumstances, as for example where the fitting is of small dimensions and is more or less inaccessible, some difficulty is experienced in entering the bolts through the appropriate apertures in the annular members and container, and also in preventing the bolts from rotating or being dislodged when a nut or the like is being entered into screw-thread engagement therewith. One method of preventing the bolts from being dislodged comprises entering them in screw-thread engagement with the annular member which is located on the inside of the container so that the shanks of the bolts protrude outwardly through the container wall. This method has the disadvantage that the shanks of some of the bolts are liable to be somewhat deflected from the true normal so that the positioning of the outer annular member or plate member is difficult, and moreover when a nut is entered and rotated in screw-thread engagement with the shank of the bolt the said bolt tends to become partly unscrewed from the inner annular member.

The object of the present invention is to provide improved means of the kind described in which the aforesaid disadvantages are overcome in a simple and effective manner.

According to the present invention we provide improved means of the kind described for securing filler caps and like fittings to fluid containers, in which the inner annular member is provided with a plurality of bolts or the like adapted to extend through aligned apertures in the inner and outer members, which members in the assembled position are firmly clamped upon the material of the container by a plurality of nuts or the like in screw-thread engagement with the said bolts, characterised in that the said apertures are formed oversize with respect to the shanks of the said bolts and locking means are provided in association with the said inner member and heads of said bolts, said locking means being of the kind adapted during assembly to permit limited rotary and/or longitudinal movement of the bolts relative to the inner member, sealing means being also provided to ensure liquid-tight joints as between the said inner member and said bolts.

The invention has the advantage that the bolts, whilst prevented from being displaced or rotated, may be wobbled slightly in the assembling operation which is thereby greatly facilitated. The invention may be applied to metal or flexible containers. Where fittings are to be applied to a metal container, the outer annular member or plate member may constitute a portion of the fitting. Where the fittings are to be applied to a flexible container, the outer member preferably comprises a separate portion ancillary to the fitting which is secured to the inner annular member by means additional to the aforesaid bolts, for example by countersunk bolts which bolts do not contribute to the attachment of the fittings to the container.

Preferably the bolts associated with the locking means are provided with heads at hexagon or other non-circular cross-section. The said locking means may comprise hexagonal-section cap members of known form having a lug or ear provided thereon, the said cap-members being mounted on the hexagon head bolts and being secured by the said ears to the inner annular member. Alternatively, the locking means may comprise an annular ring-member which is secured to the inner annular member, and which is provided with portions adapted to bridge the heads of the bolts and to engage one or more flats formed on the said heads.

Two embodiments of our invention as applied to the attachment of an outlet pipe to a self-sealing flexible fuel tank for aircraft are illustrated in the accompanying drawing in which Figure 1 is a perspective view of a portion of an annular member provided with bolts, sealing means and bolt locking means in accordance with one embodiment of the invention.

Figure 1:
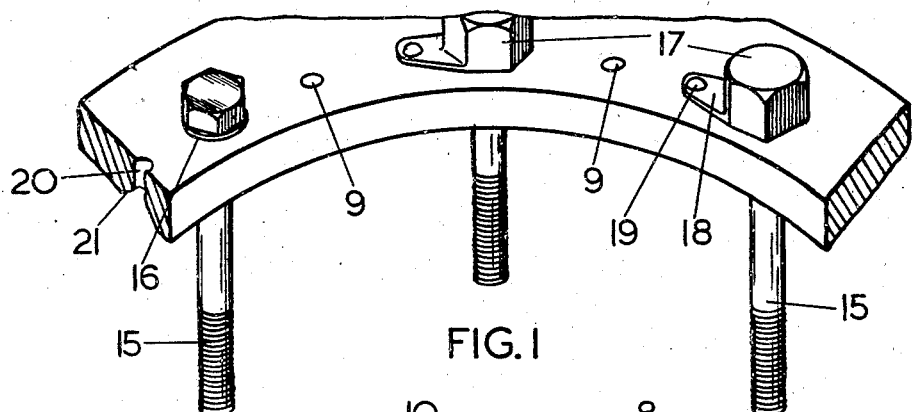
Figure 2:
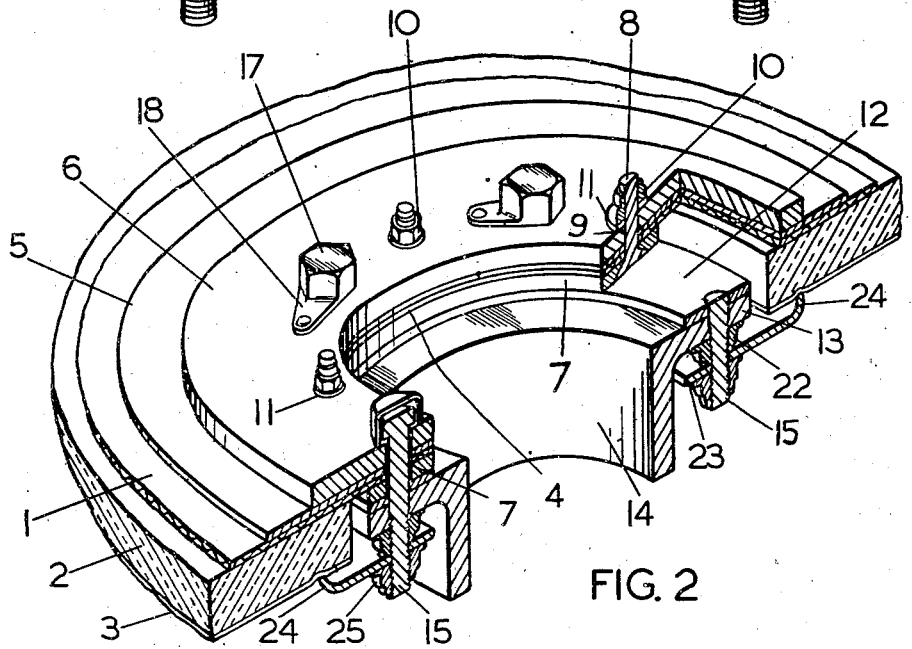
Figure 2 is a part sectional perspective view of a portion of a flexible fuel container having an outlet pipe attached thereto by means of the embodiment of the invention shown in Figure 1.

Referring to the drawing in which like numerals denote like parts and particularly to Figures 1 and 2, a flexible fuel container comprises a layer 1 of fabric material which is treated in a suitable manner to render it impervious to liquid fuel, and an outer self-sealing covering consisting of a layer 2 of swellable rubber composition and an outer layer 3 of fabric material. An aperture 4 is provided in the fabric layer 1 to constitute an outlet from the said container, and a reinforcing ring 5 of similar fabric material is adhesively secured on the inner surface of the said layer 1. The ring 5 and fabric layer 1 are secured between a substantially rigid annular member 6 (hereinafter referred to as a bolt-ring) adjacent the fabric ring 5 and another substantially rigid annular member 7 (hereinafter referred to as a face ring) adjacent the fabric layer 1 by means of counter-sink head bolts 8 which extend through aligned apertures 9 in the said fabric and said rings and which engage self-locking nuts 10, the heads of the said bolts being counter-sunk flush with the adjacent face of the face-ring, and washer 11 being provided between the said nuts 10 and bolt ring 6. The inner diameters of the said bolt-ring 6 and face-ring 7 are substantially of the same dimensions and correspond to the dimensions of the aperture 4 in the fabric layer 1 and ring 5. The outer diameter of the bolt-ring 6 is somewhat greater than the outer diameter of the face-ring 7, for a purpose described hereinafter. A sealing ring 12 is seated between the face-ring 7 and the flange 13 of a flanged outlet tube 14. The bolt ring 6 is provided with a plurality of hexagon-head bolts 15 which extend freely through aligned apertures in the aforesaid bolt-ring, fabric layers, face-ring, sealing ring, and flange of the outlet pipe. The said bolts are inserted through the apertures in the bolt-ring prior to assembly of the aforesaid parts, and are provided with sealing washers 16 located between the heads of the bolts and the bolt-ring. A pressed-out hexagon-shaped cap 17 is also fitted over the head of each bolt prior to assembly of the parts, the said caps having lugs or ears 18 formed thereon which lugs or ears are riveted to the bolt-ring by rivets 19 extending through apertures 20 in the bolt-ring. The said apertures 20 are counter-sunk bored as shown at 21 (Figure 1) and the said rivets 19 are finished flush with the corresponding face of the bolt-ring. The dimensions of the said caps are such that the bolts are prevented from rotating but are permitted a limited amount of longitudinal movement in the apertures through the bolt-ring as shown in Figure 2. The component parts thus far described are assembled in the following manner: The bolt-ring, with hexagon-head bolts and caps fitted thereto as described hereinbefore is inserted into the flexible container, the shanks of the said bolts being manipulated through the corresponding apertures in the fabric material to project outwardly therefrom and the face-ring is mounted on the projecting shanks. This is easily achieved, since the caps 17 prevent the bolts from becoming dislodged during this operation. The counter-sink head bolts 8 are then inserted through the apertures 9 and washers 11, and the nuts 10 are entered on the said bolts and tightened down, so that the fabric material layers 1 and 5 are firmly held between the bolt-ring 6 and face-ring. The sealing ring 12 and flange 13 of the outlet pipe are then mounted in sequence on the shanks of the hexagon head bolts, and nuts 22 are entered in screw-thread engagement with the said bolts and tightened down so that the various parts are firmly pressed together in liquid tight relation. The self-sealing covering is cut away to permit the said parts to be thus assembled. A clamp-ring 23 of which the outer edge is turned over as shown at 24 is provided with apertures to accept the shanks of the bolts 15 and is mounted thereon. Nuts 25 are then entered on the bolt shanks and tightened down so that the turned-over edge 24 of the clamp ring bites into the self-sealing covering which is thus clamped, together with the fabric layers 1 and 5, between the bolt-ring and clamp-ring. The said nuts 22 and 23 are also a self-locking type.

Figure 3:
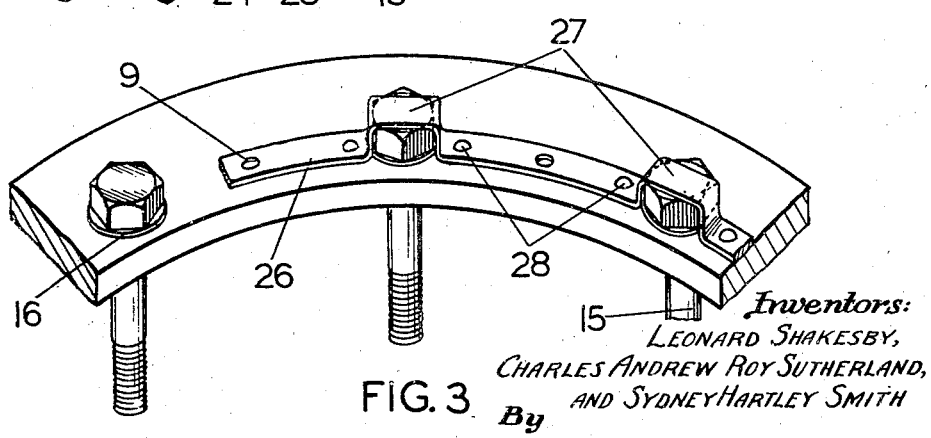
Figure 3 is a perspective view of a portion of an annular member provided with bolts, sealing means and bolt locking means in accordance with another embodiment of the invention.

In another embodiment of our invention of which a portion of the bolt-ring is shown in Figure 3, the locking means for the bolt 15 comprises a locking ring 26 having portions 27 adapted to bridge the heads of the bolts to engage two opposite flats thereof. The said locking ring is riveted to the bolt-ring by rivets 28 in similar manner to the caps 17.

In still another embodiment of our invention, (not shown in the drawing) the bolt-ring is of channel section, the distance between the flanges of the channel section corresponding to the dimensions of the heads of the bolts measured across the flats, so that the heads of the bolts are non-rotatably seated in the said channel section. In this embodiment of the invention, a substantially flat annular ring is secured to the bolt-ring to prevent longitudinal displacement of the bolts. Alternatively, the flanges of the bolt-ring may be peened over the bolt heads to prevent displacement thereof.

Whilst we have illustrated and described two embodiments of our invention as applied to the attachment of a flanged outlet pipe to a self-sealing fuel container, it is to be understood that the invention may be employed for the attachment of other fittings as for example inspection covers, filler-caps, sump-plates, hand-hole covers, recording instruments, or the like, to containers for fuel, oil, or other liquids. The invention may also be applied to containers for gases and the like.

We claim:

1. Means for securing filler caps and like fittings to a fluid container having a filling aperture, comprising an inner annular member and an outer annular member between which an edge of the apertured container material is held; an apertured filler fitting registering with the container filling aperture and having a flange disposed in alignment with said outer annular member; bolts securing said annular members and said filler fitting flange together and passing through oversize holes in said inner annular member to permit movement of the bolt shanks for ready engagement into the apertures in the component parts during assembly; and means to engage said bolts and limit rotary and longitudinal bolt movement.

2. Means for securing filler caps and like fittings to a fluid container having a filling aperture, comprising an inner annular member and an outer annular member between which an edge of the apertured container material is held; bolts passing through aligned apertures in said annular members and the container edge; an apertured filler fitting registering with the container filling aperture and having a flange disposed in alignment with said outer annular member; a second set of bolts passing through oversize holes in said inner annular member to permit movement of the bolt shanks for ready engagement into the apertures in the component parts during assembly; and means to engage said bolts and limit rotary and longitudinal bolt movement.

3. Means for securing filler caps and like fittings to a fluid container having a filling aperture, comprising an inner annular member and an outer annular member between which an edge of the apertured container material is held; an apertured filler fitting registering with the container filling aperture and having a flange disposed in alignment with said outer annular members; bolts passing through oversize holes in said innner annular member to permit movement of the bolt shanks for ready engagement into the apertures in the component parts during assembly of the container edge and fitting flange; and cap members engaging the heads of said bolts to limit rotary and longitudinal bolt movement.

4. Means for securing filler caps and like fittings to a fluid container having a filling aperture, comprising an inner annular member and an outer annular member between which an edge of the apertured container material is held; an apertured filler fitting registering with the container filling aperture and having a flange disposed in alignment with said outer annular member; bolts securing said annular members and said filler fitting flange together and passing through oversize holes in said inner annular member to permit movement of the bolt shanks for ready engagement into the apertures in the component parts during assembly, and a strip secured to said inner annular member and having cap members engaging the heads of said bolts to limit rotary and longitudinal bolt movement.

5. Means for securing filler caps and like fittings to a fluid container having a filling aperture, comprising an innner annular member and an outer annular member between which an edge of the apertured container material is held; countersunk bolts passing through aligned apertures in said annular members and the container edge; an apertured fitting registering with the container filling aperture and having a flange disposed in alignment with said outer annular member; a sealing ring between the flange of said fitting and said inner annular member; a second set of bolts securing said annular members and said filler fitting flange together and passing through oversize holes in said inner annular members to permit movement of the bolt shanks for ready engagement into the apertures in the component parts during assembly, and means to engage said bolts and limit rotary and longitudinal bolt movement.

6. Means for securing filler caps and like fittings to a fluid container having a filling aperture, comprising an inner annular member and an outer annular member of smaller diameter between which an edge of the apertured container material is held; bolts passing through aligned apertures in said annular members and the container edge; an apertured filled fitting registering with the container filling aperture and having a flange disposed in alignment with said outer annular member; a second set of bolts passing through oversize holes in said inner annular member to permit movement of the bolt shanks for ready engagement into the apertures in the component parts during assembly of the container edge and fitting flange to hold said parts in sealed relation, and a clamping ring mounted on the lower ends of said bolts and extending outwardly substantially co-extensive with said upper annular member to clamp the container material therebetween.

7. Means for securing filler caps and like fittings to a fluid container having a filling aperture formed in a layer of flexible container material and in an outer self-sealing covering material, comprising an inner annular member and an outer annular member of smaller diameter between which an edge of the flexible apertured container material is held; bolts passing through aligned apertures in said annular members and the container edge; an apertured filler fitting registering with the container filling aperture and having a flange disposed in alignment with said outer annular member; a second set of bolts securing said annular members and said filler fitting flange together and passing through oversize holes in said inner annular member to permit movement of the bolt shanks for ready engagement into the apertures in the component parts during assembly of the container edge and fitting flange to hold said parts in sealed relation, and a clamping ring mounted on the lower ends of said last-named bolts and extending outwardly substantially coextensive with said upper annular member to clamp the outer self-sealing covering material therebetween.

8. Means for securing filler caps and like fittings to a fluid container of flexible material having a filling aperture formed in a layer of flexible container material and in an outer self-sealing material, comprising an inner annular bolt ring and an outer annular face ring of smaller diameter between which the edge of the apertured layer of flexible material is held; bolts passing through said bolt and face rings and the flexible container edge; an apertured filler fitting registering with the container filling aperture and having a flange disposed in alignment with said outer annular member; a second set of bolts securing said annular members and said filler fitting flange together and passing through oversize holes in said bolt ring to permit movement of the bolt shanks for ready engagement into the apertures in the component parts during assembly of the container edge, face ring, and fitting flange to hold said parts in sealed relation; and a clamping ring mounted on the lower ends of said bolts and extending outwardly substantially co-extensive with said bolt ring to clamp the container and self-sealing covering material therebetween.

9. Means for securing filler caps and like fittings to a fluid container of flexible material having a filling aperture formed in a layer of flexible container material and in an outer layer of swellable rubber, comprising an inner bolt ring and an outer face of smaller diameter between which the edge of the apertured flexible layer of material is held; bolts passing through aligned apertures in said rings and the edge of the material; an apertured filler fitting registering with the container filling aperture and having a flange disposed in alignment with said face ring; a second set of bolts passing through oversize holes in said bolt ring to permit movement of the bolt shanks for ready engagement into the apertures in the component parts during assembly of the container edge and fitting flange to hold said parts in sealed relation; and a clamping ring mounted on the lower ends of said bolts and extending outwardly substantially co-extensive with said bolt ring to clamp the swellable rubber of said outer layer therebetween.

10. Means for securing filler caps and like fittings to a fluid container having a filling aperture, comprising an annular member secured interiorly of said container about the filling aperture and having oversized bolt holes; bolts passing through the holes in said annular member to permit restricted angular movement of said bolts, and means engaging the heads of said bolts to limit rotation and longitudinal movement thereof.

11. Means for securing filler caps and like fittings to a flexible fluid container having a filling aperture, comprising an inner annular member secured interiorly of said container about the filling aperture and having oversized bolt holes; an annular member secured exteriorly of said container about the filling aperture and between which members an edge of the apertured container material is clamped; bolts passing through the over-sized holes in said inner annular member to permit restricted angular movement of said bolts, and means carried by said inner annular member engaging the heads of said bolts to limit rotation and longitudinal movement thereof.

12. Means for securing filler caps and like fittings to a flexible fluid container having a filling aperture, comprising an inner annular member disposed interiorly of said container about the filling aperture and having oversized bolt holes; an outer annular member disposed exteriorly of said container about the filling aperture; bolts to clamp said annular members together about the container aperture with an edge of the apertured container material therebetween; a second set of bolts passing through the oversized holes in said inner annular member to permit restricted angular movement of said bolts, and means carried by said inner annular container engaging the heads of said bolts to limit rotation and longitudinal movement thereof.

LEONARD SHAKESBY.
CHARLES A. R. SUTHERLAND.
SYDNEY H. SMITH.